United States Patent [19]

Swayze

[11] Patent Number: 5,146,253
[45] Date of Patent: Sep. 8, 1992

[54] PHOTOGRAPHIC CAMERA WITH COLLAPSIBLE OPTICAL DEVICES

[75] Inventor: Samuel F. Swayze, Rochester, N.Y.

[73] Assignee: Eastman Kodak Company, Rochester, N.Y.

[21] Appl. No.: 637,855

[22] Filed: Jan. 7, 1991

[51] Int. Cl.$^5$ .................. G03B 17/04; G03B 13/10
[52] U.S. Cl. ........................... 354/187; 354/222
[58] Field of Search ............... 354/187, 221, 222, 224, 354/225

[56] References Cited

U.S. PATENT DOCUMENTS 4,831,399  3/1989  Tsurukawa et al. ............ 354/221

Primary Examiner—L. T. Hix
Assistant Examiner—J. K. Han
Attorney, Agent, or Firm—Roger A. Fields

[57] ABSTRACT

A camera comprises a first optical device including a plurality of spaced upstanding optical elements, and a second optical device including a plurality of spaced upstanding optical elements. According to the invention, the first optical device is supported for movement toward the second optical device to intersperse the optical elements of the first optical device among the optical elements of the second optical device, to store them, and for movement away from the second optical device to remove the optical elements of the first optical device from among the optical elements of the second optical device, to permit their respective use.

4 Claims, 2 Drawing Sheets

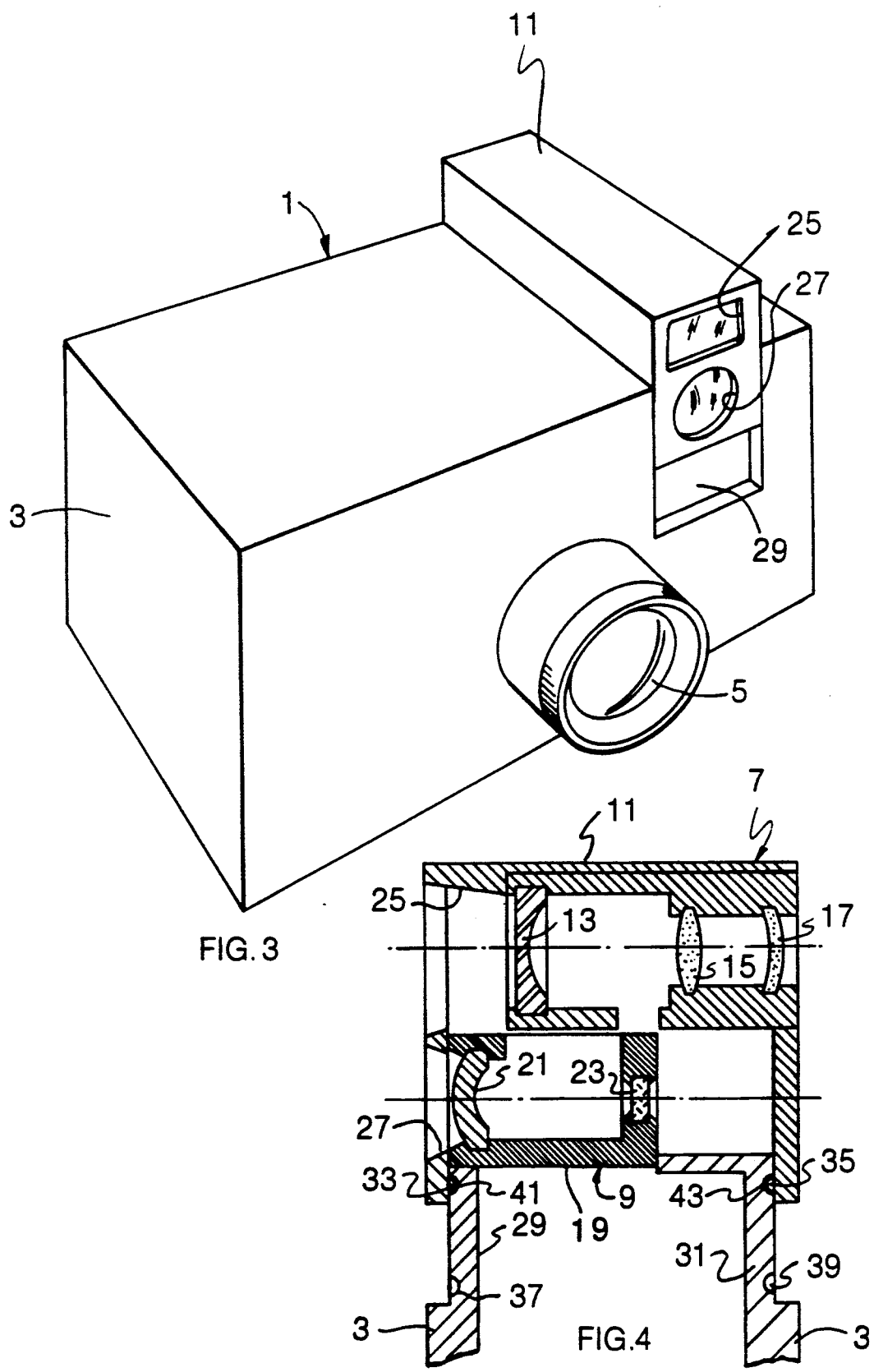

PHOTOGRAPHIC CAMERA WITH COLLAPSIBLE OPTICAL DEVICES

BACKGROUND OF THE INVENTION

1. Field of the Invention

The invention relates generally to the field of photography, and in particular to cameras having collapsible functional components such as a viewfinder unit or a taking lens assemblange.

2. Description of the Prior Art

Nowadays it is an important objective in designing cameras to provide one that is relatively compact or miniaturized. Toward this end there has been designed various cameras with one or more collapsible or foldable functional components. For example, U.S. Pat. No. 3,685,414, issued Aug. 22, 1972, discloses a camera having a pop-up viewfinder unit, and U.S. Pat. No. 4,508,440, issued Apr. 2, 1985, discloses a camera having a pivotal housing including a taking lens assemblage, a strobe unit, a viewfinder unit, and an exposure control photocell.

To-date, the camera designs continue to leave room for improvement with respect to compactness.

SUMMARY OF THE INVENTION

According to the invention, a photographic apparatus comprising a first functional component including a plurality of spaced upstanding members, and a second functional component including a plurality of spaced upstanding members, is characterized in that:

supporting means supports the first functional component for movement toward the second functional component to a storage position in which the upstanding members of the first functional component are interspersed among the upstanding members of the second functional component, to store them in a collapsed manner, and for movement away from the second functional component to a use position in which the upstanding members of the first functional component are removed from among the upstanding members of the second functional component, to permit them to be individually used.

BRIEF DESCRIPTION OF THE DRAWINGS

FIG. 3 is a front perspective view similar to FIG. 1 showing the viewfinder module in a working or use position; and FIG. 4 is a cross-sectional view similar to FIG. 2 showing the viewfinder module in its use position and the second optical device in the same position as in FIG. 2.

DETAILED DESCRIPTION OF THE PREFERRED EMBODIMENT OF THE INVENTION

Figure 1:
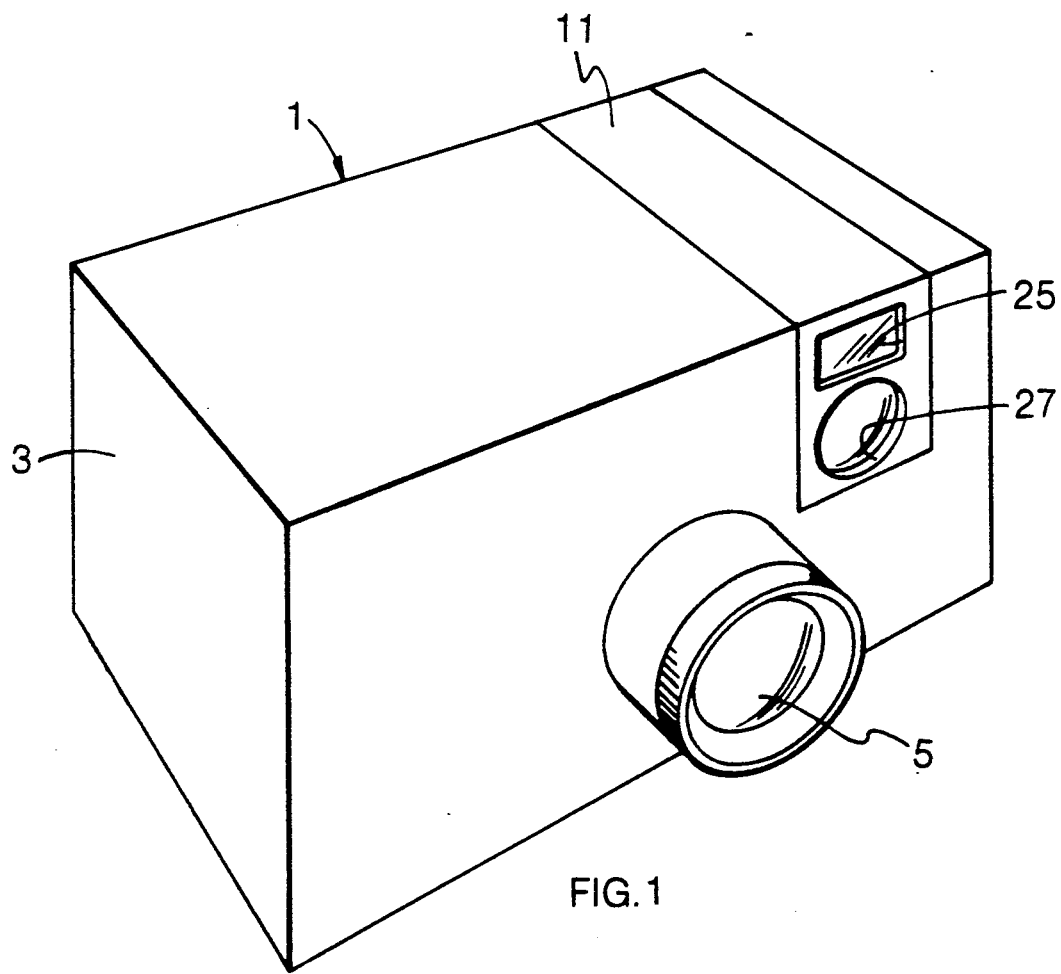
FIG. 1 is a front perspective view of a camera shown with a viewfinder module in a collapsed or storage position, according to a preferred embodiment of the invention.

The invention is disclosed as being embodied preferably in a conventional 35 mm still-picture camera. Because the features of this type of camera are well known, the description which follows is directed in particular to elements forming part of or cooperating directly with the preferred embodiment. It is to be understood, however, that other elements not shown or described may take various forms known to persons of ordinary skill in the art.

Referring to the drawings, i.e. FIGS. 1–4, a photographic camera 1 is shown with a housing or body 3. The housing 3 contains a taking lens assemblage 5, a commonplace direct see-through optical viewfinder module 7, and a commonplace optical IR receiver module 9 such as used with a known autofocus device (not shown). The viewfinder module 7 includes a casing 11 in which is secured three spaced upstanding lens elements 13, 15 and 17. The IR receiver module 9 includes a casing 19 in which is secured two spaced upstanding lens elements 21 and 23. See FIG. 2. The casing 11 has a rectangular window 25 for the lens element 13 and a circular window 27 for the lens element 21. See FIG. 4.

Figure 2:
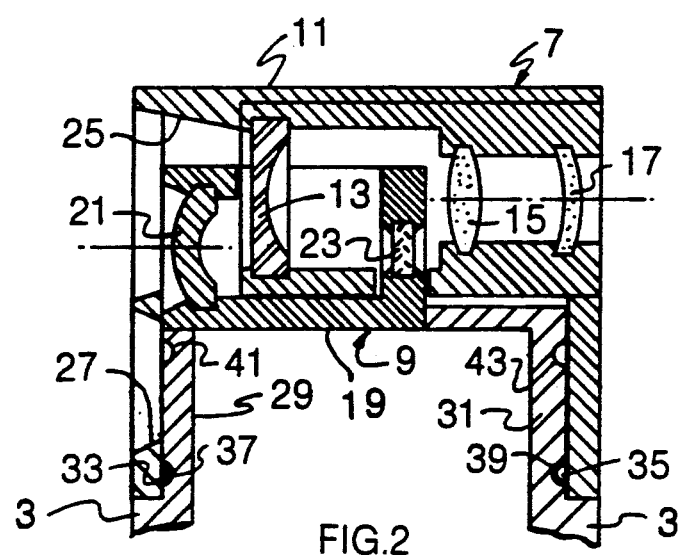
FIG. 2 is a cross-sectional view of the viewfinder module in its storage position and of a second optical device in a fixed position.

The IR receiver module 9 is fixed to the housing 3. However, as shown in FIGS. 2 and 4, the viewfinder module 7 is supported at respective upstanding portions 29 and 31 of the housing 3 for movement laterally toward the IR receiver module 9 to a storage position in which the lens elements 13 and 15 of the viewfinder module are interspersed among the lens elements 21 and 23 of the IR receiver module, to store the two modules together in a collapsed manner, and for movement laterally away from the IR receiver module to a use or working position in which the lens elements of the viewfinder module are removed from among the lens elements of the IR receiver module, to allow the two modules to be individually used. The casing 11 is manually graspable at the exterior of the housing 3 as shown in FIGS. 1 and 3 to move the viewfinder module 7 between its storage and use positions. Respective spring-urged detents 33 and 35 secured to the casing 11 are received in a first pair of recesses 37 and 39 in the upstanding portions 29 and 31 of the housing 3 to releasably hold the viewfinder module 7 in its storage position and are received in a second pair of recesses 41 and 43 in the upstanding portions to releasably hold the viewfinder module in its use position. See FIGS. 2 and 3.

The invention has been described with reference to a preferred embodiment. However, it will be appreciated that various modifications can be effected within the ordinary skill in the art without departing from the scope of the invention. For example, instead of the viewfinder module 7 and the IR receiver module 9 other functional components, i.e. non-optical types, may be supported for movement between the storage and use positions.

I claim:

1. A photographic apparatus comprising a first optical device including two optical elements separated by a space, and a second optical device including two optical elements separated by a space, is characterized in that:

supporting means supports said first optical device for movement relative to said second optical device to a storage position in which at least one of said optical elements of the first optical device is received in the space between said optical elements of the second optical device and to a use position in which said one of the optical elements of the first optical device is removed from the space between the optical elements of the second optical device; and housing means contains said first and second optical devices when the first optical device is in its storage position and contain the second optical device but not the first optical device when the first optical device is in its use position.

2. A photographic apparatus as recited in claim 1, wherein said supporting means includes integral means supporting said second optical device to locate one of said optical elements of the second optical device in the space between said optical elements of the first optical device when the first optical device is in its storage position and to remove said one of the optical elements of the second optical device from the space between the optical elements of the first optical device when the first optical device is in its use position.

3. A photographic apparatus as recited in claim 1, wherein said first optical device includes manually graspable means accessible at the exterior of said housing means when the first optical device is in its storage position for moving the first optical device to its use position.

4. A photographic apparatus as recited in claim 3, wherein said manually graspable means include respective means defining windows for said first and second optical devices.

* * * * *